(12) United States Patent
Laturell et al.

(10) Patent No.: US 7,570,708 B2
(45) Date of Patent: Aug. 4, 2009

(54) SERDES AUTO CALIBRATION AND LOAD BALANCING

(75) Inventors: Donald Laturell, Allentown, PA (US); Gregory Sheets, Northamptom, PA (US); Lane Smith, Easton, PA (US); Mohammad S. Mobin, Orefield, PA (US)

(73) Assignee: Agere Systems Inc., Allentown, PA (US)

( * ) Notice: Subject to any disclaimer, the term of this patent is extended or adjusted under 35 U.S.C. 154(b) by 420 days.

(21) Appl. No.: 11/046,669

(22) Filed: Jan. 31, 2005

(65) Prior Publication Data

US 2006/0171485 A1    Aug. 3, 2006

(51) Int. Cl.
*H04K 1/02* (2006.01)
(52) U.S. Cl. ...................................... 375/296
(58) Field of Classification Search .................. 375/226, 375/296; 370/389, 516; 348/497; 702/69
See application file for complete search history.

(56) References Cited

U.S. PATENT DOCUMENTS

| | | | |
|---|---|---|---|
| 7,099,382 B2* | 8/2006 | Aronson et al. | 375/219 |
| 2005/0281343 A1* | 12/2005 | Hsu et al. | 375/257 |
| 2007/0031153 A1* | 2/2007 | Aronson et al. | 398/138 |

OTHER PUBLICATIONS

Pease et al. Prictical Measurement of Timing Jitter Contributed by a Clock-and-Data Recovery Circuit 2005 IEEE, p. 119-126.*

* cited by examiner

*Primary Examiner*—Sam K Ahn (57) ABSTRACT

The present invention is used to automatically calibrate a SERDES device by utilizing information provided in the eye diagram of the received signal. In particular, the invention mitigates the components of determininistic jitter, such as ISI and frequency distortion. To achieve this goal, the invention enables the receive side of the SERDES to evaluate the quality of the eye received using a cost function. The invention calculates the cost function associated with the received data and then uses this information to effect an auto calibration of the SERDES device.

17 Claims, 7 Drawing Sheets

CONSECUTIVE SAMPLING TIME

FIG. 4B

CONSECUTIVE SAMPLING TIME

SERDES AUTO CALIBRATION AND LOAD BALANCING

FIELD OF THE INVENTION

The present invention is related to high-speed communications of data in a communication system and, in particular, to a method and apparatus for self-calibration of a device configured for high data rate transmission of data between components in a communication system.

BACKGROUND OF THE INVENTION

Many conventional systems for transmitting data between components within a cabinet or between cabinets of components use copper or optical backplanes for transmission of digital data. For example, high data rate transceiver systems are utilized in many backplane environments, including optical switching devices, router systems, switches, chip-to-chip communications and storage area networking switches. Other environments that utilize high-speed communication between components include inter-cabinet communication and chip-to-chip communications. Typical separation of components in such systems is between about 0.1 to about 10 meters.

Figure 1:
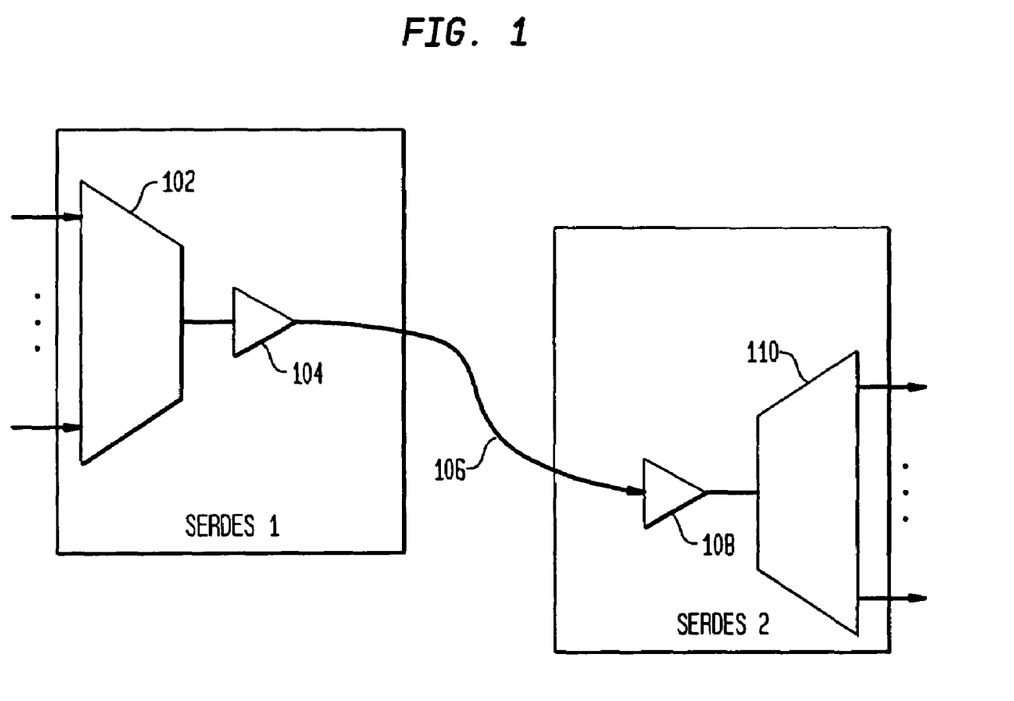
FIG. 1 is a block diagram illustrating a communication path comprising two SERDES devices.

Existing techniques utilized in such environments typically use non-return to zero (NRZ) or four-layer pulse amplitude modulation (PAM-4) signaling to send and receive information over high-speed backplanes or for high data rate chip-to-chip interconnects. Typically, the transceiver for sending high-speed data over a backplane is called a serializer/deserializer, or SERDES, device. A SERDES is a common transceiver for point-to-point high-speed connections. FIG. 1 depicts a typical SERDES application in which a serializer 102 converts a low-speed parallel data bus into a high-speed, serial data stream for transmission from SERDES1 to SERDES2 through a channel 106. A deserializer 110 then converts the high-speed serial data stream back to its original parallel format. Also illustrated are filters 104, and 108 that are employed to reduce distortions that are introduced in the transmission process. FIG. 1 shows a simplex configuration because each node is shown using only half of a SERDES. Most applications require duplex configuration, for which each node uses a full SERDES and performs both serialization (transmission) and deserialization (reception).

Figure 2A:
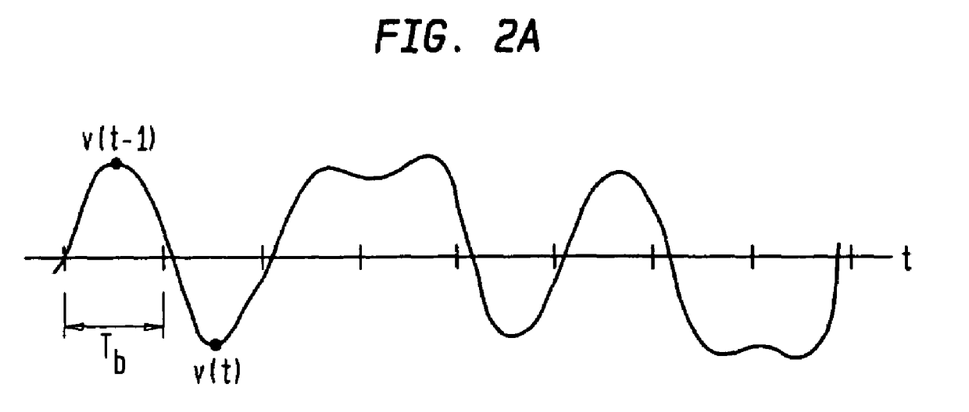
FIG. 2A illustrates a received binary signal that has been distorted by the transmission process.
Figure 2B:
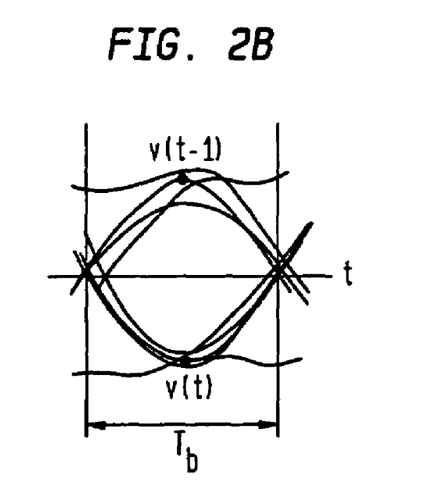
FIG. 2B is an eye-diagram corresponding to the signal of FIG. 2A.

In the actual transmission of this data, various distortions, (e.g., intersymbol interference (ISI), frequency distortions, etc.) are introduced into the signal. FIG. 2A is a simple example of such a distorted signal. In FIG. 2A, $T_b$ represents a unit time interval—the time to transmit one bit of information. The point V(t−1) and V(t) represent measured received voltages at consecutive sampling times. When this received signal is displayed on a long-persistence oscilloscope with appropriate synchronization and sweep time, the results is a superposition of successive unit time intervals, an eye-diagram, as shown in FIG. 2B. Such an eye diagram can be measured by oscilloscope or by computer simulations.

Figure 3A:
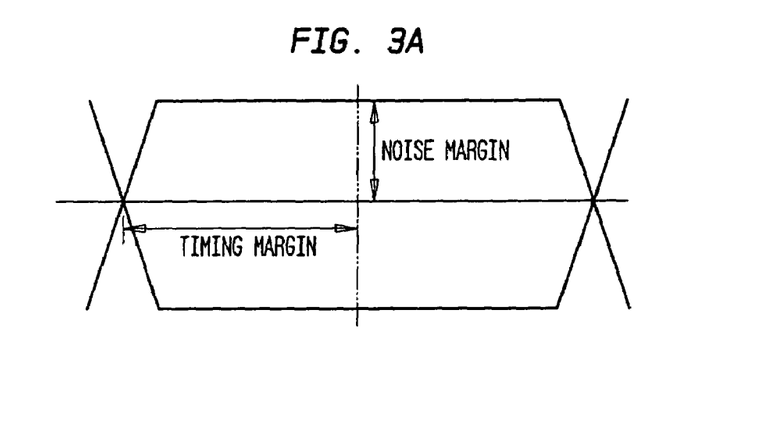
FIG. 3A is an eye-diagram of a binary NRZ receiver.

As is well-known in the art, an eye diagram is indicative of the received signal quality. FIG. 3A depicts an eye diagram for a NRZ receiver. As illustrated in FIG. 3A, the noise margin specifies how severe the noise has to be before it can cause a decision error when the receiver is sampling at its optimal sampling instance. The timing margin restricts the eye opening causing a definite probability of error. "Jitter" is an industry term which refers to the amount of variance within the rising and falling edges of the digital signal. Jitter reduces the opening of the eye and therefore limits the sampling margin.

The total jitter in a receiver can be broken down into two components, (1) random jitter and (2) deterministic jitter.

Figure 3B:
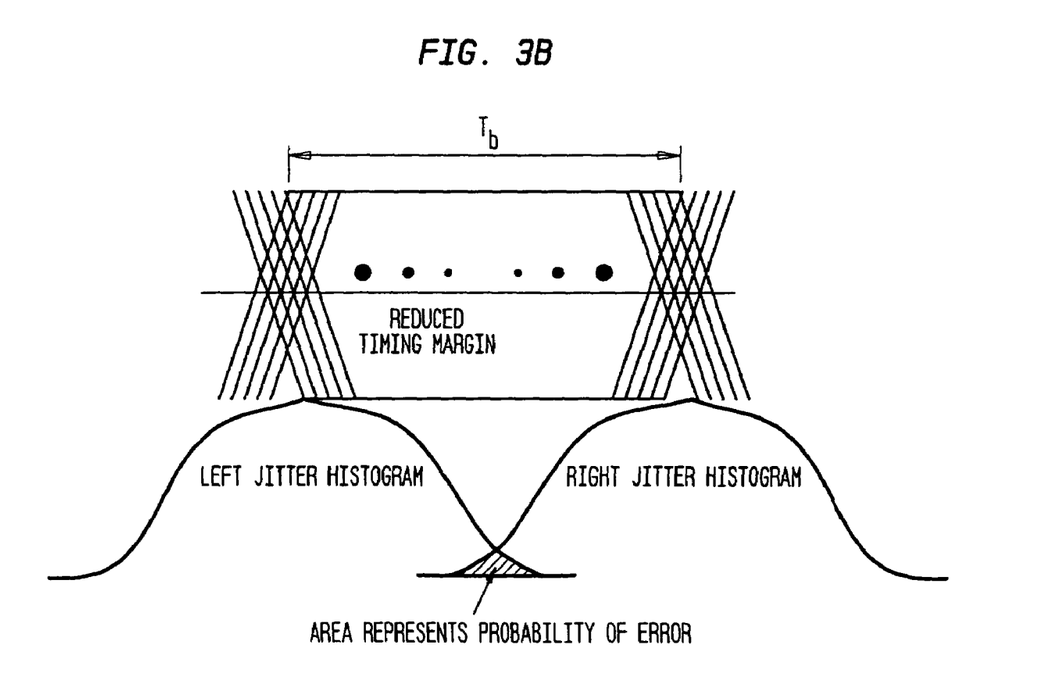
FIG. 3B illustrates the effect of random jitter on the signal of FIG. 3A.

Random jitter is mostly caused by the thermal noise in a device. FIG. 3B illustrates a statistical distribution associated with random jitter and the cumulative effect of this distribution on the rising and falling edges of a signal over one bit width or unit interval. As illustrated, random jitter reduces the sampling margin and results in a probability of error as depicted in the figure.

Deterministic jitter is reproducible and it arises due to the following well-known perturbations:
Duty cycle imbalance
ISI and frequency distortion
Periodic jitter such as xtalk, low frequency modulation, power supply ripple and parts per million drift
wander A typical SERDES device utilizes an equalizer to reduce the effects of distortions that result from deterministic jitter. This equalizer can be situated at the transmitter side (referred to as "pre-emphasis") and/or it can be placed at the receiving end (referred to as "receiver equalization"). By way of example, a first order transmit filter pre-emphasis can be applied through the following equation:

$$y(n)=x(n)-\alpha[x(n-1)],$$

where the amount of preemphasis attained in the resulting signal y(n) can be readily modified by adjustments to the $\alpha$ value.

When a SERDES device is connected to a backplane, the SERDES device must be characterized for that backplane. This is typically referred to as training the SERDES device. Moreover, subsequent to this installation process, additional calibration and configuration are later required to compensate for aging and changes in various operating conditions (e.g. ambient temperature). In the prior art, various hand calibration methods exists. However, hand calibration clearly restricts any benefit related to plug and play devices. A need exists in the prior art for automatically calibrating the SERDES, regardless of the backplane to which the SERDES is assembled.

SUMMARY OF THE INVENTION

The present invention is directed to embedding within a SERDES device a mechanism for automatically calibrating the SERDES. In particular, the present invention monitors the eye quality of the receive signal. The invention defines a cost function as a quantitative measurement of the eye quality and uses this information for auto calibration. This process is repeated until the cost function is minimized. In a typical system employing a transmitting SERDES and a receiving SERDES, this auto calibration can entail adjustments to the pre-emphasis of the transmitting SERDES, adjustments to the receiver equalization of the receiving SERDES, or both.

These and other features of the invention will be more fully understood by references to the following drawings.

DETAILED DESCRIPTION

The present invention is used to automatically calibrate a SERDES device by utilizing information provided in the eye diagram of the received signal. In particular, the invention mitigates the components of determininistic jitter, such as ISI and frequency distortion. To achieve this goal, the invention enables the receive side of the SERDES to evaluate the quality of the eye received using a cost function. The invention calculates the cost function associated with the received data and uses this information to effect an auto calibration. This feedback operation is continued until the cost function is optimized. These features will now be described in greater detail with respect to the following embodiment of the invention.

Figure 8:
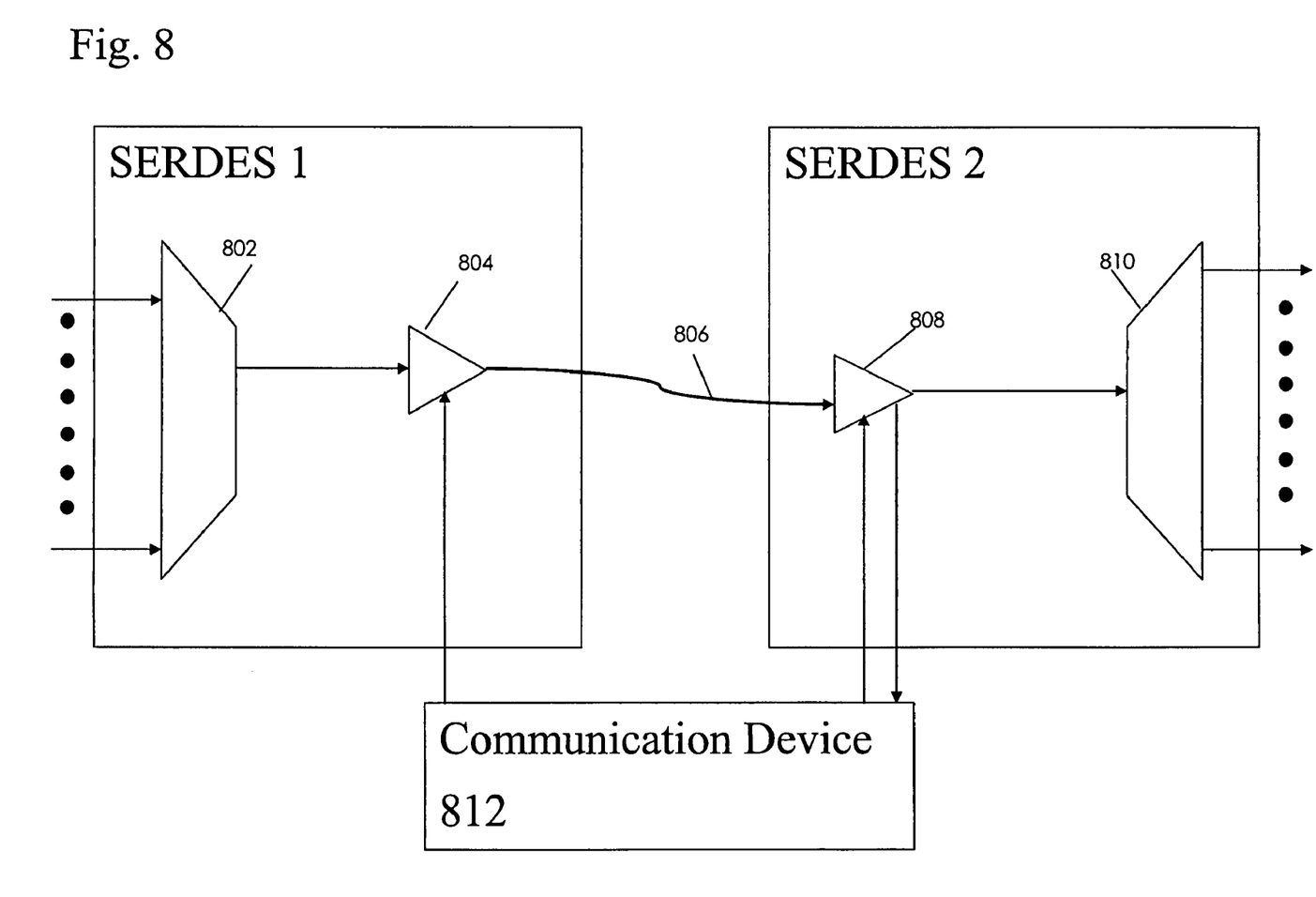
FIG. 8 shows a preferred embodiment of a SERDES transmission system according to the present invention

FIG. 8 shows a preferred embodiment of a SERDES transmission system according to the present invention. A serializer 802 converts a low-speed parallel data bus into a high-speed, serial data stream for transmission from SERDES1 to SERDES2 through a channel 806. A deserializer 810 then converts the high-speed serial data stream back to its original parallel format. Also illustrated are filters 804, and 808 that are employed to reduce distortions that are introduced in the transmission process. A communication device 812 receives a cost function value from the filter 808 of SERDES 2. The communication 812 relays the cost function value back to both 804 and 808 where the value is used to reduce distortions on the data stream. FIG. 8 shows a simplex configuration because each node is shown using only half of a SERDES. Most applications require duplex configuration, for which each node uses a full SERDES and performs both serialization (transmission) and deserialization (reception).

Figure 4A:
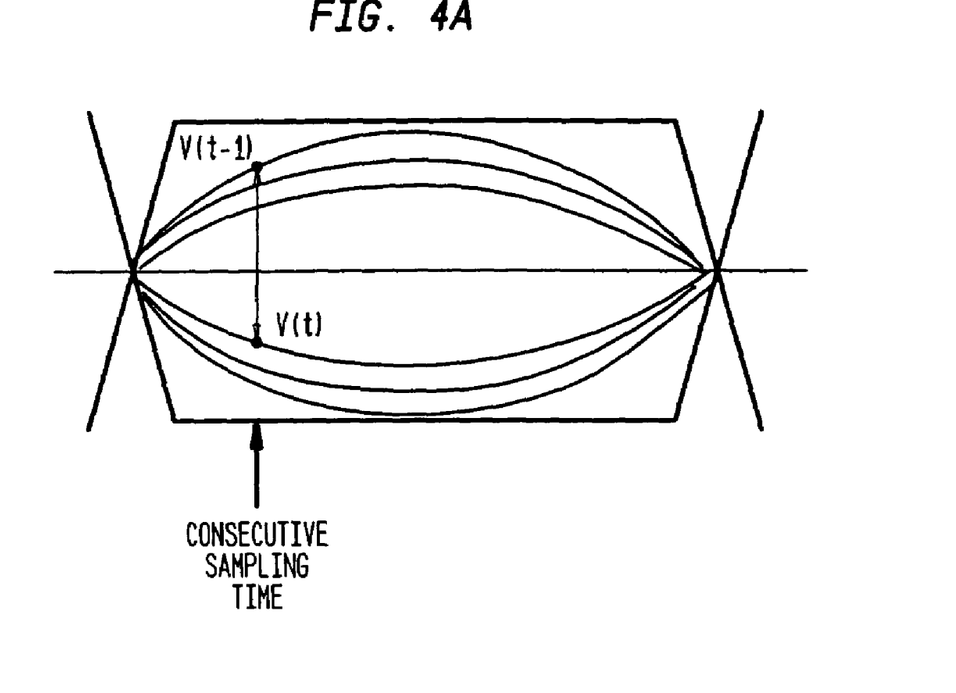
FIG. 4A illustrates an example of a "closing" eye having a relatively large voltage jitter variance as determined by an embodiment of the invention.
Figure 4B:
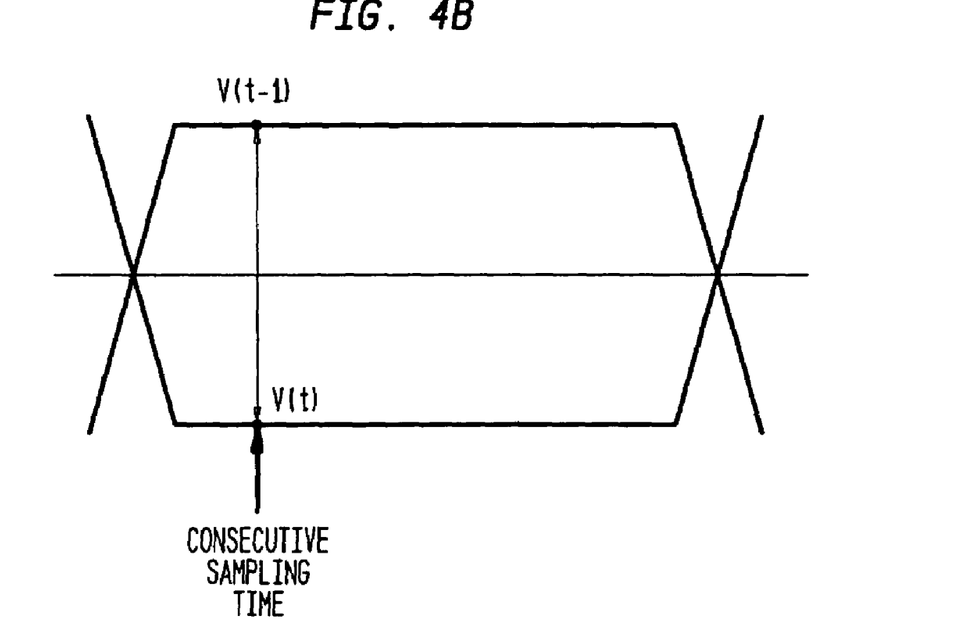
FIG. 4B illustrates an example of an "open" eye having a negligible voltage jitter variance as determined by an embodiment of the invention.

FIGS. 4A & 4B depict the cost function concept with respect to a NRZ data transmission. In these figures, V(t−1) and V(t) represent measured received voltages at consecutive sampling times (or at a subsampling rate as described further below). In FIG. 4A these voltages indicate a relatively large voltage jitter variance indicative of a "distorted eye." In FIG. 4B as these voltages are approximately equal, the voltage jitter variance approaches 0, corresponding to an open eye. In an embodiment of the invention, the following defined cost function is used as a quantitative measurement of the sample jitter variance:

$$\text{Sample Voltage Jitter Variance} = \frac{\sum_{n,m}\{\text{abs}[v(t)] - \text{abs}[v(t-1)]\}^2}{n-m},$$

where n is the starting and m is the ending numbered sample.

In one embodiment of the invention the n−m+1 samples may be obtained from consecutive sample pairs of measured voltages (e.g., v(t) and v(t−1)) of the received signal. By way of example, this may entail evaluating n−m+1 consecutive sample pairs. Further embodiments of the invention employ subsampling in which only every $k^{th}$ sample pair is used for the computations. Accordingly, to determine the Sample Voltage Jitter Variance using n−m+1 pairs of measured voltages would require analysis of a signal comprising k(n−m)+1 sample pairs. Further embodiments of the invention are envisioned in which both sampling and subsampling schemes are employed.

It is envisioned that the actual evaluation of the cost function for the received signal can be performed by a hardware device, by a processor performing software calculations, or a combination of both.

In various embodiments of the invention, once the cost function value has been derived for the received signal samples, this information is used to auto calibrate the transmitting SERDES device, the receiving SERDES device, or both. By way of examples, data may be passed to the transmitting SERDES so that it may appropriately adjust its transmit filter preemphasis (i.e. 104 of FIG. 1). This data may be the actual cost function value whereby the transmitting SERDES may determine an appropriate adjustment. Alternatively, the receiving SERDES could determine the appropriate adjustment and provide this data to the transmitting SERDES. Communication between transmitting and receiving SERDES devices can be in-band (e.g., via a Common Electrical Interface (CEI)) or out-of-band (e.g. the receiving SERDES placing the data in a register that is accessible by the transmitting SERDES).

In alternative embodiments of the invention no adjustments to the transmitting SERDES take place. Rather, the cost function value is used by the receiving SERDES to adjust its receiver equalization filter (108). Further embodiments of the invention perform adjustments to both the transmitting and receiving SERDES devices. Still further embodiments distribute the adjustment responsibility essentially evenly between the transmitter and the receiver. Such load balancing scheme has power advantage, stability advantage, and it improves finite tap receiver equalization performance.

Figure 5:
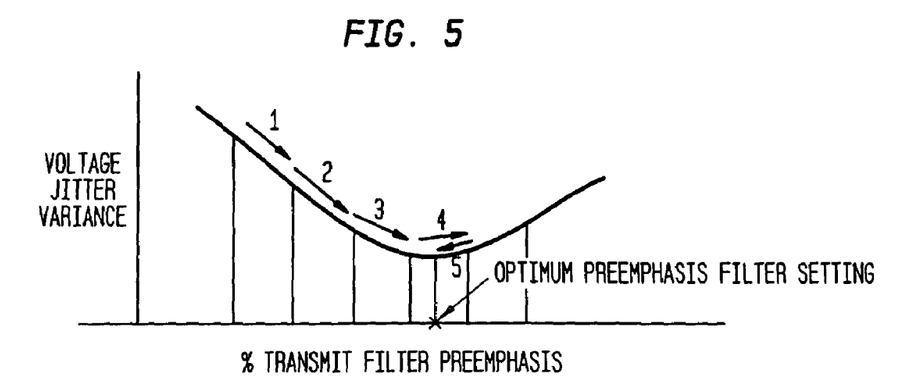
FIG. 5 illustrates successive iterations of adjustments to transmit filter preemphasis and the resulting voltage jitter variance as determined by an embodiment of the invention.

In the above described embodiments, the adjustments to the filters involved can be performed in a variety of ways. That is, the adjustment may be a fixed incremental value or percentage. Alternatively, the adjustment may be determined by an algorithm that determines the amount of adjustment as a function of the cost function value. It should be noted that the actual amount of the adjustment is not critical as the process is repeated until the cost estimate attains an optimal value. This feature of the invention is illustrated by an example depicted in FIG. 5. Five numbered iterations of the process are depicted. As illustrated, for the first four of these iterations the Voltage Jitter Variance measure decreases as the percentage filter preemphasis increases. At the fifth iteration an increase in transmit filter preemphasis results in a greater cost function value. Accordingly, the value of the transmit filter preemphasis corresponding to the fourth iteration is determined by this embodiment of the invention to be the optimum preemphasis filter setting.

Figure 6:
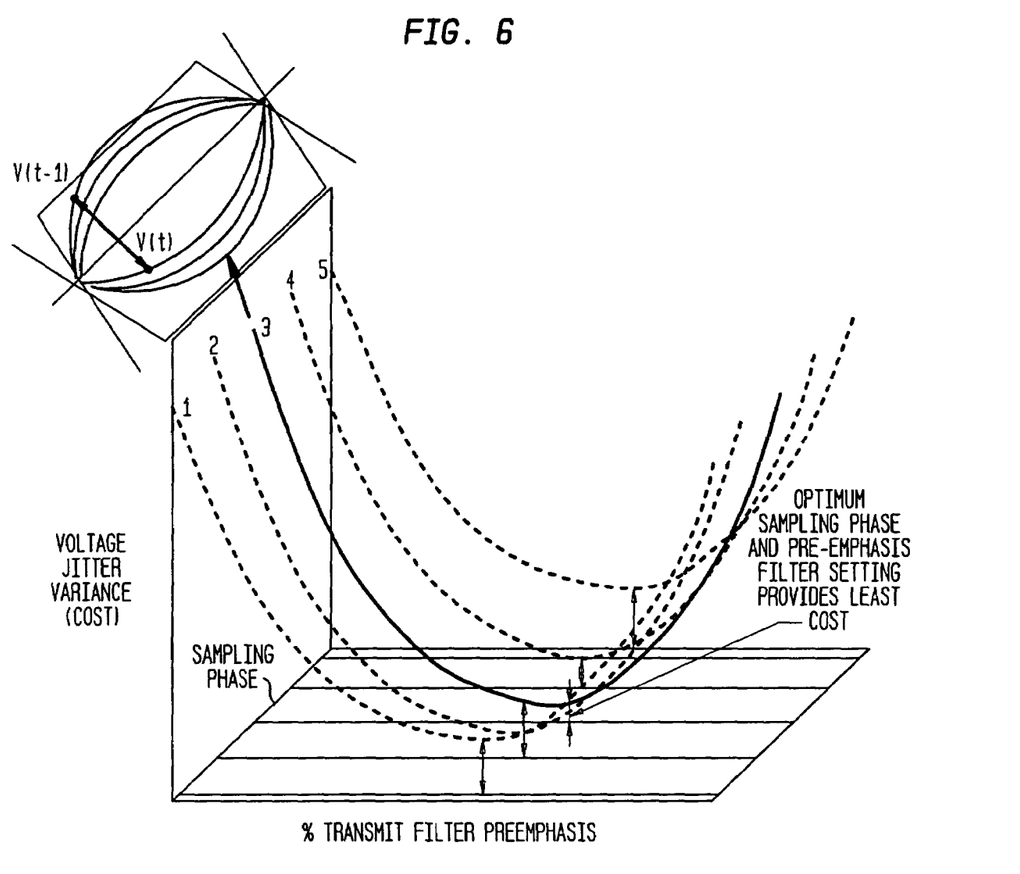
FIG. 6 illustrates the iterations of adjustments depicted in FIG. 5 as well as the voltage jitter variance as determined by an embodiment of the invention when additional sub sampling occurs; and, FIG. 7 illustrates the use of the cost function of an embodiment of the invention when a received PAM-4 data signal is being evaluated.

An additional feature of the invention will now be described with respect to a specific embodiment of the invention and the example depicted in FIG. 6. In this embodiment the receiver SERDES has determined the cost function value ("Voltage Jitter Variance") at start up and will relay the findings to the transmitter over the CEI channel. As described above, the transmit side will accordingly update the transmit filter pre-emphasis. Subsequently, the receiver will recalculate the jitter variance and relay that new information back to the transmitter. The jitter variance will be minimized continually until it starts to increase again. This process of cost function minimization is illustrated in FIG. 6. FIG. 6 depicts the same optimization obtained in the two dimensional drawing of FIG. 5 but also illustrates a third dimension, a sampling phase axis. As depicted in FIG. 6 the invention also uses the cost function to find the optimum sampling phase.

In one embodiment of the invention these two functions are performed sequentially. That is, once the invention determines the pre-emphasis filter value that minimizes the cost function, it performs a similar analysis to determine the optimum sampling phase. In a further embodiment this feature is implemented by ceasing adjustments to the transmitting SERDES and then performing adjustments to the receiver SERDES using the above described sub sampling algorithm. In this manner, the quality of the received signal is "fine-tuned" using only periodic sampling and adjustments to the receiving SERDES device alone.

In additional embodiments of the invention the optimum sampling phase determination can be performed independent of the optimization of the transmit filter pre-emphasis. Accordingly, the optimum sampling phase can be determined concurrently with the transmit filter pre-emphasis analysis.

Figure 7:
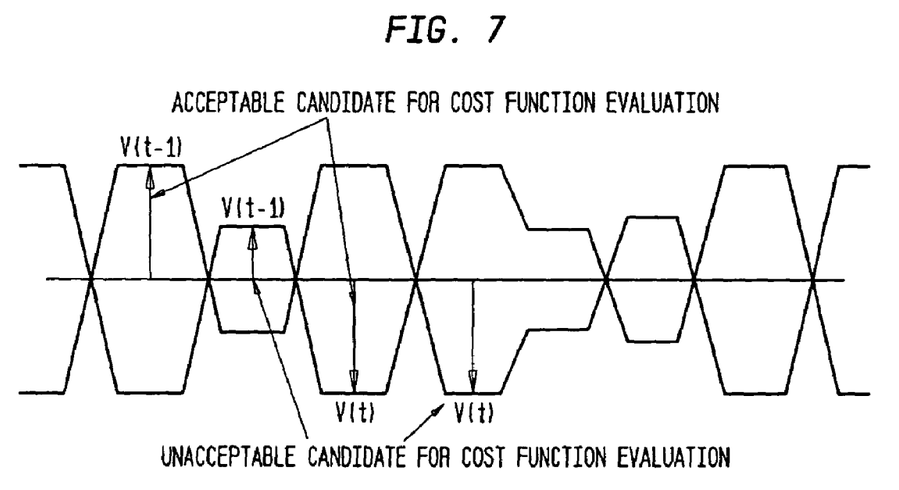

The eye monitoring cost function evaluation was described above with respect to NRZ data transmission. The invention is applicable to other types of signaling schemes as well, to include four-layer pulse amplitude modulation (PAM-4) signaling in which multiple characters may be sent at one time. Accordingly, in the case of PAM-4 data transmission, analysis of the signal is required for meaningful cost function evaluation such that the differential amplitude between two consecutive measurements is taken on the same slicer level. This requirement is illustrated in FIG. 7 in which both acceptable and unacceptable candidates are depicted.

In each of the embodiments depicted above, the auto calibration feature of the present invention can be invoked in a variety of ways. By way of examples, the feature may be part of the initial training of the SERDES device, may be invoked at power-up of the SERDES device, may be periodically scheduled, may be performed upon user request, or may be triggered by some error condition detected in the received signal. These examples are applicable to the transmitting SERDES, the receiving SERDES or both. Further, these examples, are meant to be illustrative only as the invention is not limited to these examples.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A transmission system, comprising:
    a transmitting serial/deserializer transceiver (SERDES) device configured for transmission of a signal, said transmission introducing distortions into said signal;
    a receiving SERDES device configured to receive said transmitted signal, said receiving SERDES device comprising a calculator means for determining a cost function value related to said distortions, said cost function value determined by evaluating eye quality of the received signal; and,
    a communication device for communicating the cost function value to at least one of the SERDES devices wherein this value is used to reduce said distortions, wherein the cost function is an estimate of jitter variance, the estimate determined by:

$$\text{jitter variance estimate} = \frac{\sum_{n,m} \{\text{abs}[v(t)] - \text{abs}[v(t-1)]\}^2}{n-m},$$

where v(t−1) and v(t) are measured received voltages at consecutive sample times, t−1 and t, and where n denotes a starting and in an ending received signal sample.

2. The apparatus of claim 1 further comprising a transmit preemphasis filter located on the transmitting SERDES device whereby said cost function value is utilized to adjust the transmit preemphasis filter.

3. The apparatus of claim 2 wherein an optimum transmit preemphasis filter setting is obtained by performing successive iterations of determining cost function value and transmit preemphasis filter adjustments.

4. The apparatus of claim 3 wherein communication utilizing said communication device is chosen from the group consisting of in-band and out-of-band signaling.

5. The apparatus of claim 1 further comprising a receiver equalization filter located on the receiving SERDES device whereby said cost function value is utilized to adjust the receiver equalization filter.

6. The apparatus of claim 5 wherein an optimum receiver equalization filter setting is obtained by performing successive iterations of determining cost function value and receiver equalization filter adjustments.

7. A transmission system, comprising:
    a transmitting serial/deserializer transceiver (SERDES) device configured for transmission of a signal, said transmission introducing distortions into said signal;
    a receiving SERDES device configured to receive said transmitted signal, said receiving SERDES device comprising a calculator means for determining a cost function value related to said distortions, said cost function value determined by evaluating eye quality of the received signal;
    a communication device for communicating the cost function value to at least one of the SERDES devices wherein this value is used to reduce said distortions; and,
    a transmit preemphasis filter located on the transmitting SERDES device whereby said cost function value is utilized to adjust the transmit preemphasis filter, wherein an optimum transmit preemphasis filter setting is obtained by performing successive iterations of determining cost function value and transmit preemphasis filter adjustments and wherein communication utilizing said communication device is chosen from the group consisting of in-band and out-of-band signaling.

8. A method of reducing distortions introduced into a signal transmitted over a communication path comprising a transmitting serial/deserializer transceiver (SERDES) device and a receiving SERDES device, said method comprising:
    determining a cost function value related to said distortions; and,
    communicating the cost function value to at least one of the SERDES devices, wherein this value is used to reduce said distortions and the cost function value is determined by evaluating eye quality of the received signal as an estimate of jitter variance, the estimate determined by:

$$\text{jitter variance estimate} = \frac{\sum_{n,m}\{\text{abs}[v(t)] - \text{abs}[v(t-1)]\}^2}{n-m},$$

where v(t−1) and v(t) are measured received voltages at consecutive sample times, t−1 and t, and where n denotes a starting and m an ending received signal sample.

9. The method of claim 8 wherein the cost function value is determined using subsampling of the received signal.

10. The method of claim 8 further comprising utilizing said cost function value to adjust a transmit preemphasis filter located on the transmitting SERDES device.

11. The method of claim 10 further comprising obtaining an optimum transmit preemphasis filter setting by performing successive iterations of determining cost function value and transmit preemphasis filter adjustments.

12. The method of claim 8 further comprising utilizing said cost function value to adjust a receiver equalization filter located on the receiving SERDES device.

13. The method of claim 12 further comprising obtaining an optimum receiver equalization filter setting by performing successive iterations of determining cost function value and receiver equalization filter adjustments.

14. The method of claim 12 wherein adjustments are performed to both the transmit preemphasis filter and the receiver equalization filter and wherein successive iterations of determining cost function value are used to distribute adjustments essentially evenly between the transmit preemphasis filter and the receiver equalization filter.

15. A transceiver chip comprising:
a receiver device configured to receive a transmitted signal, said signal containing distortions; and,
a calculation device for determining a cost function value related to said distortions, wherein said cost function value is used to reduce said distortions and the cost function is an estimate of jitter variance, the estimate determined by:

$$\text{jitter variance estimate} = \frac{\sum_{n,m}\{\text{abs}[v(t)] - \text{abs}[v(t-1)]\}^2}{n-m},$$

where v(t−1) and v(t) are measured received voltages at consecutive sample times, t−1 and t, and where n denotes a starting and in an ending received signal sample.

16. The transceiver chip of claim 15 further comprising a receiver equalization filter whereby said cost function value is utilized to adjust the receiver equalization filter.

17. A transceiver chip comprising:
a receiver device configured to receive a transmitted signal, said signal containing distortions;
a calculation device for determining a cost function value related to said distortions, wherein said cost function value is used to reduce said distortions; and,
a receiver equalization filter whereby said cost function value is utilized to adjust the receiver equalization filter,
wherein the cost function is an estimate of jitter variance, the estimate determined by:

$$\text{jitter variance estimate} = \frac{\sum_{n,m}\{\text{abs}[v(t)] - \text{abs}[v(t-1)]\}^2}{n-m},$$

where v(t−1) and v(t) are measured received voltages at consecutive sample times, t−1 and t, and where n denotes a starting and m an ending received signal sample.

* * * * *